(12) United States Patent
Fontanazzi et al.

(10) Patent No.: US 10,549,485 B2
(45) Date of Patent: Feb. 4, 2020

(54) PACKAGING APPARATUS FOR FORMING SEALED PACKAGES FROM A TUBE OF PACKAGING MATERIAL

(71) Applicant: Tetra Laval Holdings & Finance S.A., Pully (CH)

(72) Inventors: Paolo Fontanazzi, Modena (IT); Davide Borghi, Modena (IT); Massimo Pradelli, Reggio Emilia (IT); Stefano Flore, Bologna (IT); Fabrizio Rimondi, Bologna (IT); Fabio Curbastro Ricci, Bologna (IT)

(73) Assignee: TETRA LAVA HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/308,144

(22) PCT Filed: Jun. 1, 2017

(86) PCT No.: PCT/EP2017/063345
§ 371 (c)(1),
(2) Date: Dec. 7, 2018

(87) PCT Pub. No.: WO2017/211689
PCT Pub. Date: Dec. 14, 2017

(65) Prior Publication Data
US 2019/0160758 A1 May 30, 2019

(30) Foreign Application Priority Data
Jun. 9, 2016 (EP) .................................... 16173634

(51) Int. Cl.
*B29C 65/00* (2006.01)
*B29C 65/18* (2006.01)
(Continued)

(52) U.S. Cl.
CPC .......... *B29C 66/4312* (2013.01); *B29C 65/18* (2013.01); *B29C 65/74* (2013.01);
(Continued)

(58) Field of Classification Search
CPC .............. B29C 66/4312; B29C 53/306; B29C 66/73921; B29C 65/18; B29C 66/8226;
(Continued)

(56) References Cited

U.S. PATENT DOCUMENTS 6,408,600 B1 * 6/2002 Nankervis ............. B29C 65/226
53/477
7,155,883 B2 * 1/2007 Baldanza ............ B29C 66/8351
53/552
(Continued)

FOREIGN PATENT DOCUMENTS

EP        0887265 A1    12/1998
EP        1832518 A1    9/2007
(Continued)

OTHER PUBLICATIONS

International Search Report and Written Opinion in corresponding PCT Application No. PCT/EP2017/063345 dated Aug. 8, 2017 (12 pages).

*Primary Examiner* — Chelsea E Stinson
*Assistant Examiner* — Jacob A Smith
(74) *Attorney, Agent, or Firm* — Finnegan, Henderson, Farabow, Garrett and Dunner, LLP

(57) ABSTRACT

There is described a packaging apparatus (1) for forming sealed packages (2) from a tube (3). The packaging apparatus (1) has an endless conveyor device (7) arranged in a conveyor zone (8), conveying carts (9) and operative units (10, 10') moved by the plurality of conveying carts (9) along a path (P, Q). Each operative unit (10, 10') moves between an operative configuration, in which the operative unit (10,
(Continued)

10') manipulates the tube (3) and a rest configuration in which the operative unit (10, 10') is detached from the tube (3). Each operative unit (10, 10') has a half-shell (36) and one of a sealing element (37a) or a counter-sealing element (37b) and each operative unit (10, 10') is carried by one respective conveying cart (9) and extends laterally away therefrom so that the conveyor zone (8) is laterally spaced apart from an operative zone (33) where the tube is manipulated.

14 Claims, 4 Drawing Sheets

(51) Int. Cl.
  *B65B 51/30* (2006.01)
  *B29C 65/74* (2006.01)
  *B65B 65/00* (2006.01)
  *B29L 31/00* (2006.01)
  *B29K 705/02* (2006.01)

(52) U.S. Cl.
  CPC ...... *B29C 66/1122* (2013.01); *B29C 66/7234* (2013.01); *B29C 66/72341* (2013.01); *B29C 66/73921* (2013.01); *B29C 66/81457* (2013.01); *B29C 66/8226* (2013.01); *B29C 66/8244* (2013.01); *B29C 66/82263* (2013.01); *B29C 66/8351* (2013.01); *B29C 66/849* (2013.01); *B65B 51/306* (2013.01); *B65B 65/00* (2013.01); *B29C 66/71* (2013.01); *B29C 66/72328* (2013.01); *B29K 2705/02* (2013.01); *B29L 2031/7166* (2013.01)

(58) Field of Classification Search
  CPC .......... B29C 66/82263; B29C 66/8244; B29C 66/8351; B65B 9/06; B65B 51/30
  USPC ......... 53/396, 374.5, 450, 551, 374.3, 374.6
  See application file for complete search history.

(56) References Cited

U.S. PATENT DOCUMENTS

2012/0285130 A1\* 11/2012 Kamigaito .......... B29C 66/1122
                                                               53/548
2016/0185090 A1\* 6/2016 Leonelli ............. B32B 37/0046
                                                               156/583.5

FOREIGN PATENT DOCUMENTS

| EP | 2311738 A1 | 4/2011 | |
|---|---|---|---|
| WO | WO 00-64741 A2 | 11/2000 | |
| WO | WO-0064741 A2 * | 11/2000 | ............. B29C 65/02 |
| WO | WO0064741 A2 * | 11/2000 | ............. B29C 65/02 |

\* cited by examiner

PACKAGING APPARATUS FOR FORMING SEALED PACKAGES FROM A TUBE OF PACKAGING MATERIAL

CROSS-REFERENCE TO RELATED PATENT APPLICATIONS

This is a National Phase of International Application No. PCT/EP2017/063345, filed Jun. 1, 2017, which claims the benefit of European Application No. 16173634.3 filed Jun. 9, 2016. The entire contents of the above-referenced applications are expressly incorporated herein by reference.

TECHNICAL FIELD

The present invention relates to a packaging apparatus for forming a plurality of sealed packages for pourable food products starting from a tube of packaging material.

BACKGROUND ART

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by creasing and sealing laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the a web of packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; the web so sterilized is then maintained in a closed, sterile environment, and is folded and sealed longitudinally to form a tube, which is fed along a vertical advancing direction.

In order to complete the forming operations, the tube is filled with the sterilized or sterile-processed food product, and is sealed and subsequently cut along equally spaced transversal cross sections within a packaging apparatus of the packaging machine during advancement along the vertical advancing direction.

Pillow packages are so obtained within the packaging apparatus, each pillow package having a longitudinal sealing band and a pair of top and bottom transversal sealing bands.

A packaging apparatus used in packaging machines is known, as described for example in European Patent EP-B-0887265, which comprises a first chain conveyor and a second chain conveyor being spaced apart from each other and defining an advancement space between each other through which the tube passes while being advanced along the advancement direction.

In greater detail, the first chain conveyor has a plurality of first operative units mounted to a first endless chain, adapted to advance along a first endless path and each one comprising a half-shell, a sealing element and an extractable cutting element. The second conveyor comprises a plurality of second operative units mounted to a respective second endless chain, adapted to advance along a second endless path and each one being associated to a respective first operative unit. Each second operative unit comprises a half-shell, a counter-sealing element and a seat. Each first operative unit, in particular the respective half-shell, the sealing element and the extractable cutting element is designed to cooperate with the associated second operative unit, in particular the respective half-shell, the respective counter-sealing element and the respective seat for forming in collaboration the packages.

In more detail, the sealing element is a heating element and the counter-sealing element is made of elastomeric material, which provides mechanical support to grip the tube during the sealing process.

Furthermore, the packaging apparatus comprises a first cam surface arranged in the proximity of the first chain conveyor and adapted to move the first operative units between an operative configuration in which the operative units contact the tube and a rest configuration in which the second operative units are detached from the tube. The packaging apparatus also has a second cam surface positioned in the vicinity of the second chain conveyor and configured to move the second operative units between an operative configuration and a rest configuration. In particular, each one of the first operative units and the respective second operative units cooperate with each other when being in their respective operative configurations.

A drawback of the packaging apparatus disclosed in EP-B-0887265 is the extensive work needed for servicing the packaging apparatus itself. In the case of e.g. a format change the operative units need to be adapted to the new format which requires disassembling of the chains of the first chain conveyor and second chain conveyor for working on the single operative units as otherwise the space available is not sufficient to perform the desired tasks. The disassembling of the chains requires, however, extensive work and leads to rather elevated downtimes of the production.

Similar, in the case of a malfunction of e.g. one operative unit typically at least one of the respective chains of the first chain conveyor and second chain conveyor must be disassembled as a whole. Thus, only after disassembling of the respective chain it is possible to work on resolving the malfunction.

Hence, the servicing of the packaging apparatus disclosed in EP-B-0887265 leads to rather elevated downtimes of the overall production process which again increases the economical losses.

DISCLOSURE OF INVENTION

It is therefore an object of the present invention to provide a packaging apparatus to overcome, in a straightforward manner, the aforementioned drawbacks.

According to the present invention, there is provided a packaging apparatus as claimed in claim 1.

BRIEF DESCRIPTION OF THE DRAWINGS

A non-limiting embodiment of the present invention will be described by way of example with reference to the accompanying drawings, in which.

BEST MODES FOR CARRYING OUT THE INVENTION

Number 1 indicates as a whole a packaging apparatus for producing sealed packages 2 of a pourable food product, such as pasteurized milk or fruit juice, from a tube 3 of sheet packaging material. It is known that such packages 2 have a top transversal seal band and a bottom transversal seal band.

The packaging material has a multilayer structure (not shown), and comprises a layer of fibrous material, normally paper, covered on both sides with respective layers of heat-seal plastic material, e.g. polyethylene.

In the case of aseptic packages for long-storage products, such as UHT milk, the packaging material also comprises a layer of gas- and light-barrier material, e.g. aluminum foil or ethylene vinyl alcohol (EVOH) film, which is superimposed on a layer of heat-seal plastic material, and is in turn covered with another layer of heat-seal plastic material forming the inner face of the package eventually contacting the food product.

Tube 3 is formed in a known manner by longitudinally folding and sealing a web (not shown and known as such) of heat-seal sheet packaging material, is filled by a pipe (not shown and known as such) with the sterilized or sterile-processed food product for packaging, and is fed, in a known manner not shown, to packaging apparatus 1.

Figure 1:
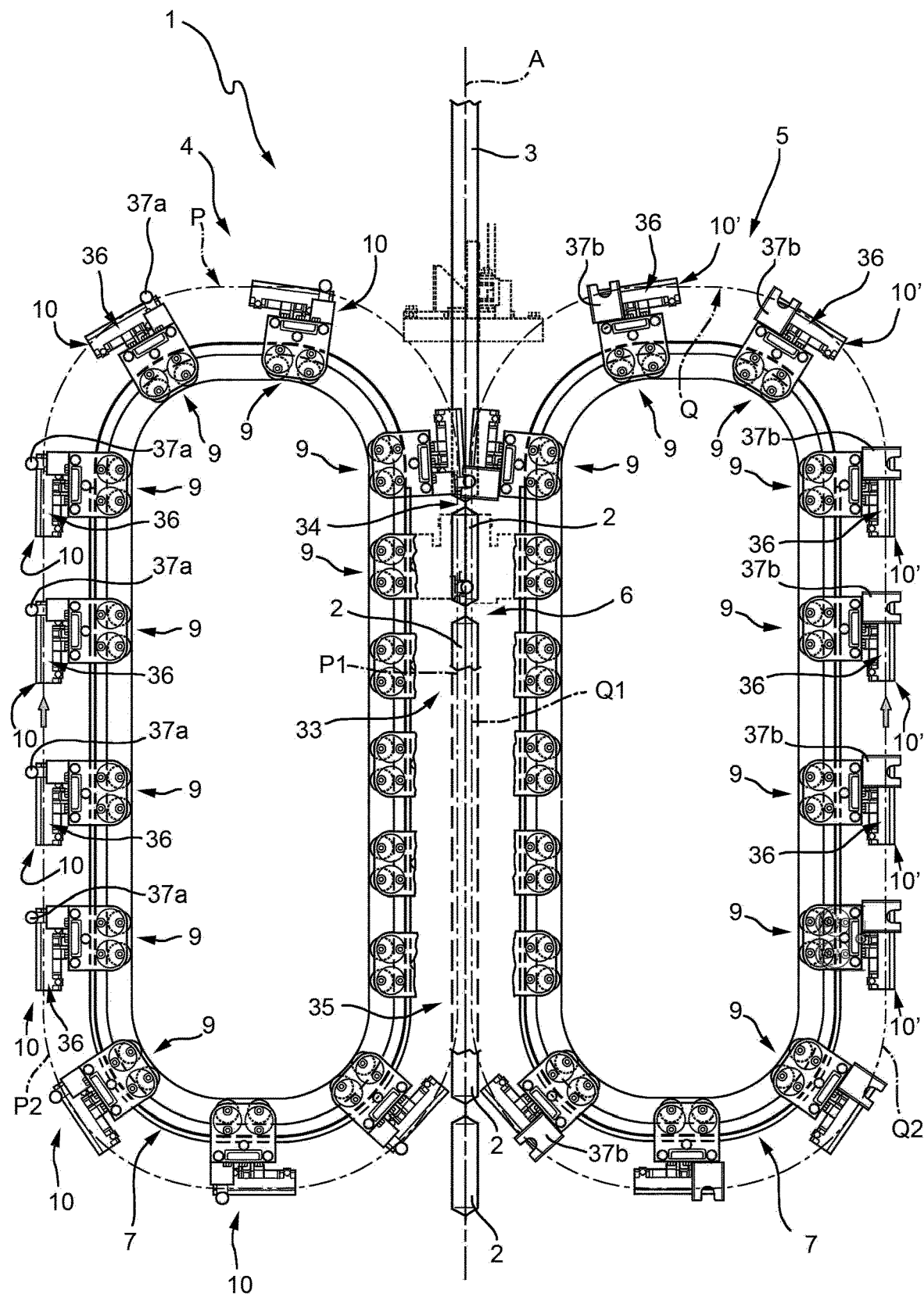
FIG. 1 shows a frontal view of a packaging apparatus according to the present invention, with parts removed for clarity.

Furthermore, tube 3 is advanced within packaging apparatus 1 along an advancement axis A of packaging apparatus 1, in particular in the example shown in FIG. 1 axis A has a vertical orientation.

Packaging apparatus 1 comprises a first forming assembly 4 and a second forming assembly 5 adapted to interact with tube 3 so as to form packages 3 from tube 3.

In more detail, forming assemblies 4 and 5 are spaced apart from one another and facing each other. In particular forming assemblies 4 and 5 are positioned at respective lateral, in particular opposite, sides with respect to axis A. Furthermore, forming assemblies 4 and 5 delimit at least partially a forming space 6 through which, in use, tube 3 advances along axis A.

In more detail, forming assembly 4 comprises:

an endless conveyor device 7 arranged within a conveyor zone 8 of apparatus 1;

a plurality of conveying carts 9 adapted to cooperate with and to advance, in particular each one independent from the other ones, along the endless conveyor device 7, in particular conveying carts 9 being adapted 20 to advance along a cart path (not shown); and a plurality of operative units 10 adapted to be moved by conveying carts 9 along a path P defined by the movement of conveying carts 9 along conveyor device 7 and, in particular being parallel to the cart path and having an operative portion P1 parallel to advancement axis A and each operative unit 10 being adapted to interact, in use, with tube 3.

In more detail, the cart path lies within a first plane H1 and path P lies within a second plane H2. In particular, plane H1 and plane H2 being spaced apart from one another and being parallel to one another. Even more particularly, plane H1 and plane H2 being spaced apart along a spacing axis B, axis B being orthogonal to axis A and to planes H1 and H2. Furthermore, planes H1 and H2 are parallel to axis A, in particular axis A lies within plane H2.

Furthermore, forming assembly 4 comprises a support frame 14 carrying conveyor device 7. Frame 14 is supported by a support structure (not shown) of apparatus 1.

In particular, frame 14 has a plate-like configuration and laterally extends along axis B.

Figure 2:
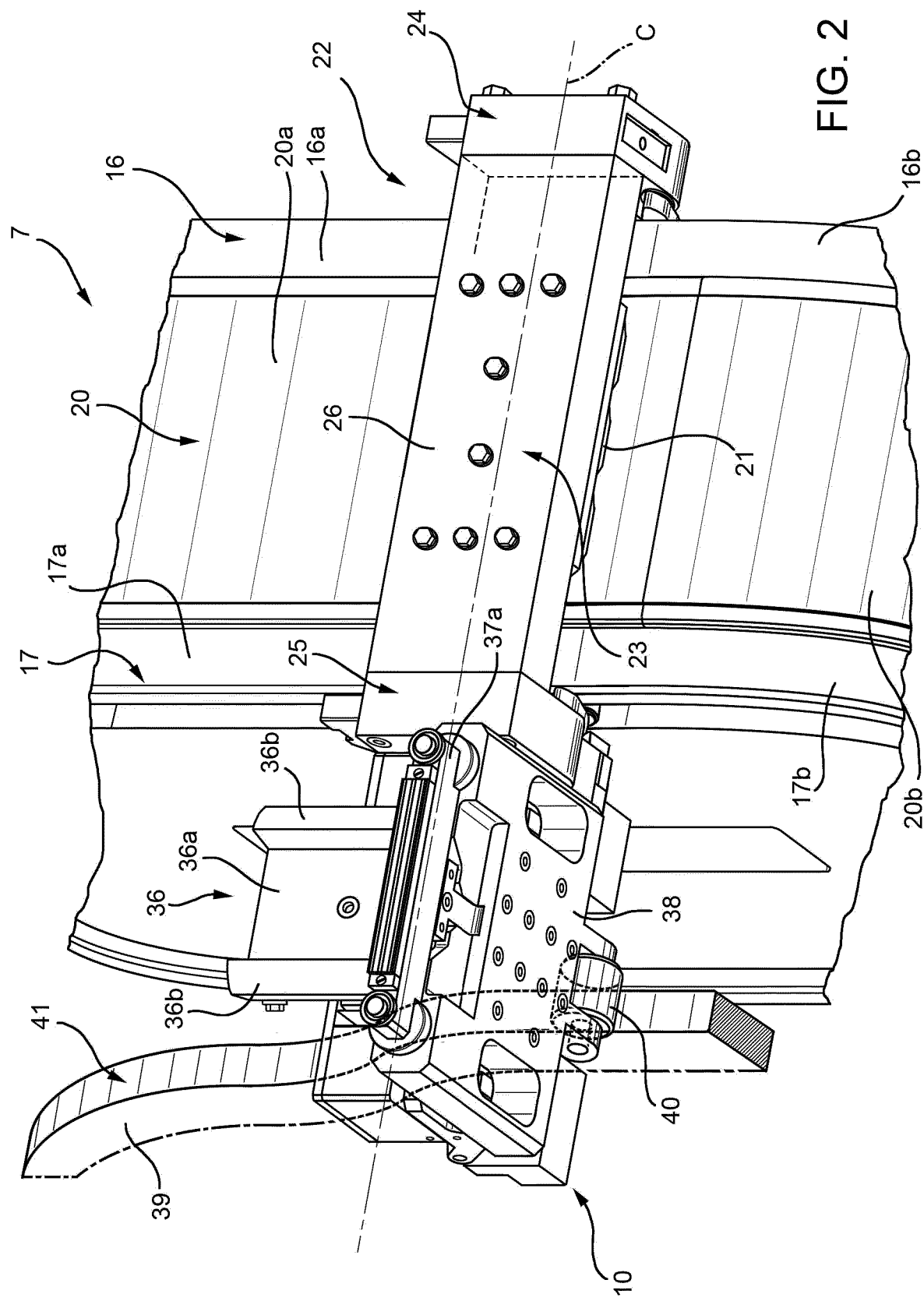
FIG. 2 shows a perspective side view of a detail of the packaging apparatus of FIG. 1, with parts removed for clarity.
Figure 3:
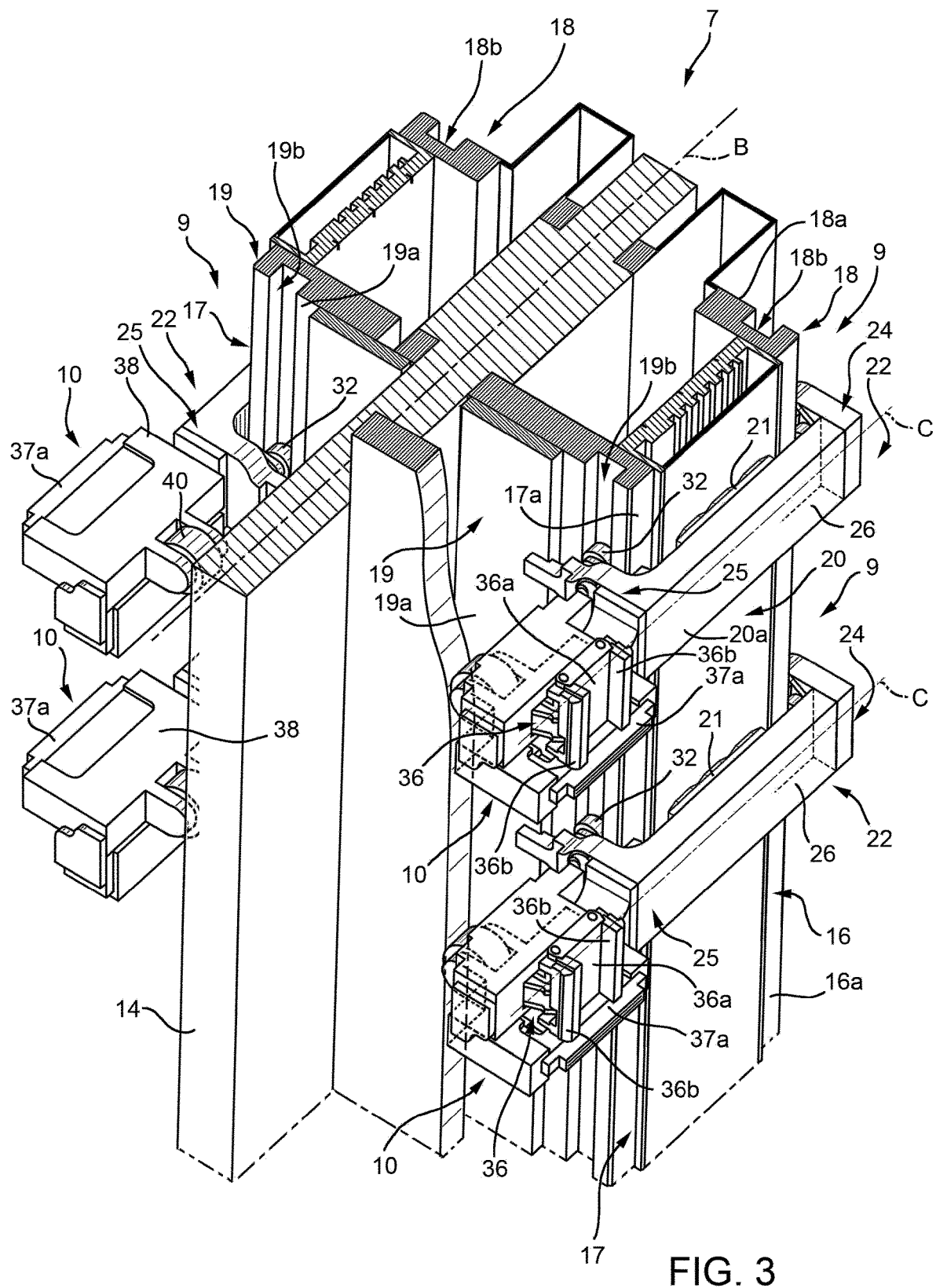
FIG. 3 shows a perspective top-side view of another detail of the packaging apparatus of FIG. 1, with parts removed for clarity.
Figure 4:
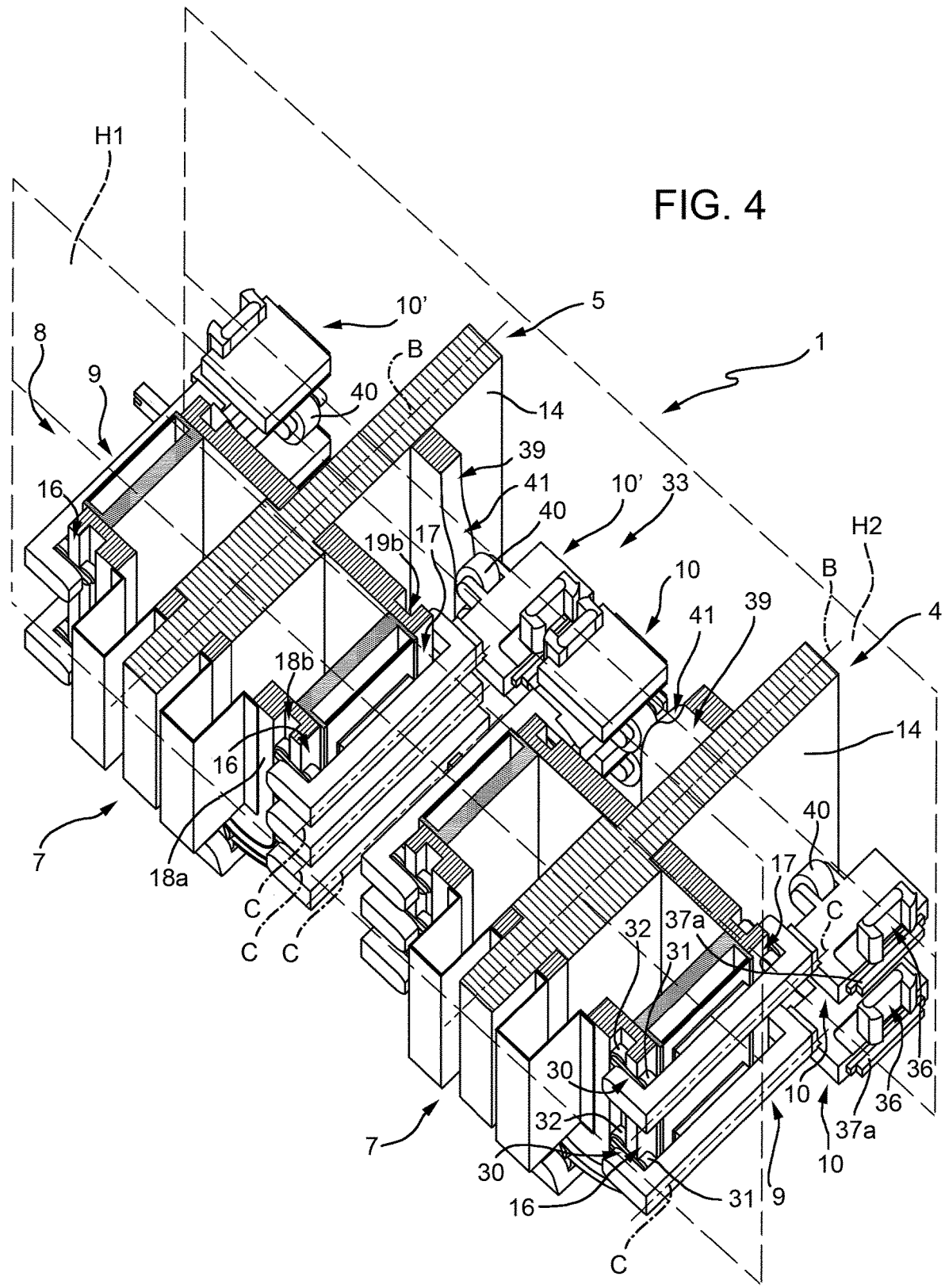
FIG. 4 shows a perspective top view of an even further detail of the packaging apparatus of FIG. 1, with parts removed for clarity.

With particular reference to FIGS. 2 to 4, conveyor device 7 comprises a first endless guide rail 16 and a second endless guide rail 17 arranged parallel and spaced apart from each other and being adapted to moveably support the plurality of conveying carts 9. In particular, guide rails 16 and 17 are supported by frame 14.

Furthermore, each guide rail 16 and 17 comprises a respective pair of parallel straight rail portions 16a and 17a, in particular parallel to axis A and a pair of curved rail portions 16b and 17b. The straight rail portions 16a and 17a being arranged parallel to axis A and the curved rail portions 16b and 17b connecting, respectively, straight rail portions 16a and 17a with each other.

More specifically, conveyor device 7 comprises a first endless rail assembly 18 and a second endless rail assembly 19 carrying respectively guide rails 16 and 17. Rail assemblies 18 and 19 are spaced apart from each other and are arranged parallel to each other.

In more detail, rail assemblies 18 and 19 have a pair of plate-like linear sections 18a and 19a and a pair of plate-like curved sections (not shown) for connecting the linear sections 18a and 19a with each other. Additionally, rail assemblies 18 and 19 are configured to partially receive frame 14 in such a manner that frame 14 supports rail assemblies 18 and 19. In particular, rail assemblies 18 and 19 are oriented perpendicular to frame 14.

Furthermore, rail assemblies 18 and 19 comprise respectively an oval-shaped groove 18b and 19b provided along the respective peripheries of rail assemblies 18 and 19 and configured to delimit respective guide rails 16 and 17.

Furthermore, conveyor device 7 comprises a plurality of coil assemblies (not shown and known as such) adapted to interact with conveyor carts 9. In particular, the coil assemblies are configured to selectively control advancement of conveyor carts 9 along conveyor device 7. More specifically, the coil assemblies are adapted to generate electromagnetic fields to interact with conveyor carts 9.

The coil assemblies are arranged between guide rails 16 and 17, in particular between rail assemblies 18 and 19.

In particular, the coil assemblies can be selectively excited (or energized) so as to advance carts 4 along carrier 2 independently from each other.

Furthermore, conveyor device 7 has a cover 20, in particular having an oval configuration, arranged between guide rails 16 and 17, in particular between rail assemblies 18 and 19. Cover 20 comprises a pair of straight portions 20a parallel to frame 14 and a pair of curved portions 20b (only one partially shown in FIG. 2) connecting straight portions 20a with each other.

With particular reference to FIGS. 2 to 4, each conveying cart 9 comprises:

a magnet assembly 21 adapted to interact with conveyor device 7, in particular with the coil assemblies of conveyor device 7, even more particularly with the electromagnetic fields generated by the coil assemblies for controlling advancement of cart 9 along conveyor device 7, in particular independently from the other carts 9; and a cart base 22 adapted to be movably and reversibly mounted onto conveyor device 7, in particular by engaging with guide rails 16 and 17 and to move along conveyor device 7.

Furthermore, each cart 4 comprises connecting means 23, in particular in the specific example eight screw members, for removably coupling the respective cart base 22 to the respective magnet assembly 21. In the specific example each magnet assembly 21 comprises a plurality of magnet elements (not shown) designed to provide for a defined magnet field strength. Alternatively, the magnet assembly 21 could comprise one single magnet element providing for the needed characteristics.

In more detail, each cart 9, in particular the respective cart base 22 comprises:

a first side portion 24 adapted to engage with guide rail 16; and a second side portion 25 opposite of side portion 24 and configured to engage with guide rail 17.

In further detail, side portions 24 and 25 are distanced from each other along a respective separation axis C, in particular axis C being orthogonal to axis A. Furthermore, axis C is parallel to axis B. Axis C is also orthogonal to planes H1 and H2.

In even further detail, side portions 24 and 25 are perpendicular to cover 20 and orthogonal to frame 14 when engaging with the respective straight rail portions 16a and 17a.

Furthermore, each cart 9, in particular the respective cart base 22 has a main portion 26 adapted to be interposed between and connected to the side portions 24 and 25, in particular extending parallel to axis C. More specifically, main portion 26 is arranged perpendicular to side portions 24 and 25. Preferably, main portion 26 is parallel to frame 14 and to the facing portion of cover 20. At least side portion 24 is removably coupled to main portion 26, in particular for allowing mounting and dismounting of the respective cart 9, in particular of the respective cart base 22 to conveyor device 7. In the specific embodiment disclosed both side portion 24 and 25 are removably coupled to main portion 26. In particular, each cart base 22 comprises respective first coupling means and second coupling means for removably connecting side portions 24 and 25 to main portion 26.

Furthermore, each main portion 26 is configured to removably couple to the respective magnet assembly 22, in particular in such a manner that the respective magnet assembly 22 is spaced apart from cover 20 and interposed between main portion 22 and cover 20. Accordingly, the respective connecting means 23 of each cart 9 are designed to cooperate with the respective main portion 26.

With particular reference to FIGS. 2 to 4, side portions 24 and 25, each comprises one respective wheel group 30 adapted to run along respectively guide rail 16 and 17.

Furthermore, each wheel group 30 comprises a front pair of wheels 31 and a rear pair of wheels 32 adapted to run along respectively guide rails 16 and 17. In particular, each front pair of wheels 31 and the respective rear pair of wheels 32 are configured to sandwich in between respectively guide rails 16 and 17.

With particular reference to FIGS. 1 to 4, each operative unit 10 is carried, in particular removably carried, by one respective conveying cart 9 and extends laterally away therefrom.

In more detail, each operative unit 10 is connected, in particular removably connected, to side portion 25 of the respective cart 9. More specifically, each operative unit 10 extends away from cart 9 along axis C. In further detail, operative unit 10 extends laterally away from the respective cart 9, in particular from the respective side portion 25, so that conveyor zone 8 is laterally spaced apart along axis C from an operative zone 33 of apparatus 1, distinct from conveyor zone 8. In use, the operative unit 10 interacts with tube 3 in the operative zone 33. In particular, in use, tube 3 is manipulated within operative zone 33, in particular for forming packages 2.

Furthermore, each operative unit 10 is adapted to be selectively moved between an operative configuration, reached along operative portion P1 of path P and in which operative unit 10 is adapted to manipulate tube 3, and a rest configuration, reached along a rest portion P2 of path P distinct from operative portion P1 and in which operative unit 10 is detached from tube 3.

More specifically, each operative unit 10 substantially advances within operative zone 33 when advancing along operative portion P1 of path P. Operative portion P1 extends from a starting station 34 to an end station 35 and rest portion P2 extends from end station 35 to starting station 34.

In particular, when, in use, one respective operative unit 10 advances on operative portion P1, i.e. from starting station 34 to end station 35, the respective cart 9 moves along the respective straight rail portions 16a and 17a of respective guide rails 16 and 17. In addition, when, in use, one respective operative unit 10 advances on rest portion P2, i.e. from end station 35 to starting station 34, the respective cart 9 moves along the respective curved rail portions 16b and 17b and the respective straight rail portions 16a and 17a.

Furthermore, each operative unit 10 comprises a half-shell 36 adapted to contact tube 3 and to at least partially define the shape of packages 2; and one of a sealing element 37a or a counter-sealing element 37b, in the specific example shown a sealing element 37a, adapted to transversally seal tube 3 between adjacent packages 2.

In particular, each half-shell 36 is adapted to be controlled between a working position and a rest position by means of a driving assembly (not shown). In particular, each half-shell 36 is adapted to be controlled into the working position with the respective operative unit 10, in use, being set in the respective operative configuration.

More specifically, each half-shell 36 has a C-shaped configuration and comprises:

a main wall 36a; and a pair of lateral flaps 36b, in particular being laterally moveable and in particular being arranged in such a manner that lateral flaps 36b extend towards axis A when, in use, the respective operative unit 10 advances along operative portion P1; i.e. between starting station 34 and end station 35.

In more detail, each sealing element 37a is a heating element. Furthermore, each counter-sealing element 37b is made of an elastomeric material and is adapted to provide mechanical support to grip tube 3 during the sealing process.

Each operative unit 10 also comprises a base 38 removably connected to the respective side portion 25 and carrying the respective half-shell 36 and the respective sealing element 37a or counter-sealing element 37b.

Furthermore, each operative unit 10 has one of a cutting element (not shown and known as such) or a counter-cutting element (not shown and known as such) adapted to transversally cut tube 3 between adjacent packages 2, in particular supported by the respective base 38.

In more detail, in the respective operative configuration of each operative unit 10 the respective half-shell 36 is configured to contact tube 3, in particular the respective half-shell 36 is set in its respective working portion and the respective sealing element 37a or the respective counter-sealing element 37b are configured to laterally seal tube 3 between adjacent packages 2.

Furthermore, forming assembly 4 comprises a cam assembly, in particular a cam 39 spaced apart from carrier device 7 and adapted to cooperate with each operative unit 10, in particular for selectively moving each operative unit 10 in its respective operative or rest configuration. In particular, cam 39 is designed to selectively move operative units 10 towards or away from axis A, in particular towards or away from tube 3.

In more detail, cam 39 is oriented substantially parallel to axis A and substantially parallel to guide rails 16 and 17. Furthermore, frame 14 supports cam 39.

In even more detail, each operative unit 10 comprises a cam follower 40 adapted to interact with cam 39. Each cam follower 40 is designed to follow a profile defined by cam 39 for moving the respective operative unit 10 towards or away from axis A, in particular towards or away from tube 3. In the specific example shown, each cam follower 40 is a wheel designed to run over a cam surface 41 of cam 39.

With particular reference to FIGS. 1 and 4, forming assembly 5 is similar to forming assembly 4. Therefore, the following description is limited to the differences between them, and using the same references, where possible, for identical or corresponding parts.

In particular, forming assembly 5 differs from forming assembly 4 basically by including a plurality of operative units 10'.

Operative units 10' are similar to operative units 10 and differ from operative units 10 by being moved by the respective conveying carts 9 of forming assembly 5 along a path Q defined by the movement of conveying carts 9 along the respective endless conveyor device 7 and, in particular being parallel to the respective cart path of the respective conveying carts 9 of forming assembly 5. In particular, path Q lies in plane H2 and the respective cart path lies in plane H1.

In more detail, path Q has an operative portion Q1 parallel to advancement axis A and to operative portion P1 and each operative unit 10' being adapted to interact, in use, with tube 3. Furthermore, operative units 10' can be selectively moved between a respective operative configuration, reached along operative portion Q1 of path Q and in which operative unit 10' is adapted to manipulate tube 3 in collaboration with one respective operative unit 10 being in its respective operative configuration, and a rest configuration, reached along a rest portion Q2 of path Q distinct from operative portion Q1 and in which operative unit 10' is detached from tube 3.

Furthermore, the respective half-shell 36 of each operative unit 10' is adapted to at least partially define in cooperation with the respective half-shell 36 of the respective operative unit 10 the shape of packages 2. Additionally, each operative unit 10' comprises the other one of a sealing element 37a or a counter-sealing element 37b adapted to transversally seal the tube between adjacent packages 2 in collaboration with counter-sealing element 37b or sealing element 37a of the respective operative unit 10. In the specific example shown, each operative unit 10 has one respective sealing element 37a and each operative unit 10' has one respective counter-sealing element 37b.

Furthermore, each operative unit 10' comprises the other one of a cutting element (not shown) or a counter-cutting element (not shown) adapted to transversally cut tube 3 between adjacent packages 2 in collaboration with the counter-cutting element or the cutting element of the respective operative unit 10.

In use, tube 3 advances along axis A and through operative zone 33. Furthermore, carts 9 of forming assembly 4 and carts 9 of forming assembly 5 advance along their respective conveyor devices 7. In particular, the independent advancement of carts 9 is controlled by interaction between the respective magnet assemblies 21 and the respective coil assemblies.

Advancement of carts 9 along their respective conveyor devices 7 leads to advancement of the respective operative units 10 along path P and of the respective operative units 10' along path Q.

During advancement of operative units 10 along path P and of operative units 10' along path Q, operative units 10 and operative units 10' are moved between their respective operative and rest configurations, in particular through interaction of operative units 10 and operative units 10' with the respective cam 39, even more particularly by the respective cam followers 40 of operative units 10 and 10' running over the respective cam surface 41. The respective cam followers 40 follow the profile defined by the respective cam 39 and move thereby the respective operative units 10 and 10' towards or away from axis A, i.e. the respective operative units 10 and 10' move towards or away from tube 3.

In particular, operative units 10 and 10' are in their respective operative configurations while advancing along their respective operative portions P1 and Q1 and they are in their respective rest configurations while advancing along their respective rest portions P2 and Q2.

Furthermore, while advancing along their respective operative portions P1 and Q1 operative units 10 and 10' contact tube 3 and manipulate tube 3 for forming packages 2. In particular, each operative unit 10 advancing along operative portion P1 and being in its respective operative configuration cooperates with one respective operative unit 10' advancing along operative portion Q1 and being in its respective operative configuration.

More specifically, during advancement of one respective operative unit 10 along operative portion P1 and of the respective operative unit 10' along operative portion Q1, each operative unit 10 contacts tube 3 from one side and the respective operative unit 10 contacts tube 3 from the other side. In particular, the respective walls 36a and the respective flaps 36b enclose in cooperation tube 3 for partially defining the shape of the respective package 2. In particular, the shape is of the parallelepiped type. Furthermore, the sealing element 37a of operative unit 10 and the counter-sealing element 37b of the respective operative unit 10' laterally seal, in particular in collaboration, the respective package 2, in particular along a transversal bottom portion of package 2 for defining the bottom transversal seal band. After that the respective cutting element and the respective counter-cutting element cut tube 3. It is clear that the top transversal seal band along a transversal top portion of package 2 is provided for by a successive pair of cooperating operative units 10 and 10'.

The formed packages 2 are then guided towards further packaging apparatus. In particular, after formation of packages 2, packages 2 are released from contact with the respective operative unit 10 and the respective operative unit 10' and vertically fall by means of gravity onto an outlet conveyor (not shown and known as such). Alternatively, after formation of packages 2, packages 2 are guided by the respective operative unit 10 or the respective operative unit 10' onto the outlet conveyor and are arranged on the outlet conveyor in, preferentially, a horizontal orientation.

The advantages of apparatus 1 according to the present invention will be clear from the foregoing description.

A particular advantages lies in dividing conveyor zone 8 from operative zone 33, which are laterally separated from each other. This permits an operator to assess more easily operative units 10 and 10' and to possibly perform maintenance work (e.g. change of format, resolution of a malfunction, etc.) on operative unit 10 and 10' without removing these from their respective carts 9.

A further advantage lies in the possibility to remove, if necessary, one operative unit 10 or 10' without removing the other ones and without the need to remove the respective cart 9.

An even further advantage is that carts 9 are mounted independently from the other carts 9 to the respective conveyor device 7 allowing to, if necessary, removing one single cart 9 with or without the respective operative unit 10 or 10'.

Overall, apparatus 1 allows to be serviced in such a manner to reduce the downtime of the production process.

Clearly, changes may be made to apparatus 1 as described herein without, however, departing from the scope of protection as defined in the accompanying claims.

The invention claimed is:

1. A packaging apparatus for forming a plurality of sealed packages from a tube of packaging material advanced along an advancement axis of the packaging apparatus, the packaging apparatus comprising:
   at least an endless conveyor device arranged in a conveyor zone;
   a plurality of conveying carts configured to cooperate with and to advance along the at least endless conveyor device; and
   a plurality of operative units configured to be moved by the plurality of conveying carts along a first path defined by the movement of the conveying carts along the endless conveyor device, wherein the first path has an operative portion parallel to the advancement axis;
   wherein each operative unit is configured to be selectively moved between (a) an operative configuration, reached along said operative portion of the first path and at which the operative unit is configured to manipulate the tube, and (b) a rest configuration, reached along a rest portion of the first path distinct from the operative portion and in which the operative unit is detached from the tube;
   wherein each operative unit comprises:
      a half-shell configured to at least partially define the shape of the packages; and
      at least one of a sealing element or a counter-sealing element, configured to transversally seal the tube, between adjacent packages, with respect to the advancement direction;
      wherein each operative unit is carried by one respective conveying cart and extends laterally away from the conveying cart in a transverse direction with respect to the advancement axis so that the conveyor zone is laterally spaced apart from an operative zone where the tube is manipulated;
   wherein each one of the plurality of conveying carts is configured to advance along a cart path, the cart path being parallel to the first path;
   wherein the cart path extends along a first plane and the first path extends along a second plane;
   wherein the first plane and the second plane are spaced apart from one another in the transverse direction and are parallel to one another; and
   wherein the first plane and the second plane are parallel to the advancement axis and parallel to a direction of movement of each operative unit moving between the rest configuration and the operative configuration.

2. The packaging apparatus according to claim 1, wherein each conveying cart comprises a first side portion and a second side portion opposite of the first side portion and the first side portion and the second side portion being distanced from each other along a respective separation axis perpendicular to the advancement axis, and wherein the respective operative unit extends away from the respective conveying cart along the separation axis.

3. The packaging apparatus according to claim 2, wherein the endless conveyor device comprises a first endless guide rail and a second endless guide rail arranged parallel and spaced apart from each other and configured to moveably support the plurality of conveying carts, and wherein the respective first side portion of each conveying cart is configured to engage with the first endless guide rail and the respective second side portion of each conveying cart is configured to engage with the second endless guide rail.

4. The packaging apparatus according to claim 3, wherein each first side portion and each second side portion comprises a respective wheel group configured to run along respectively at least one of the first endless guide rail or the second endless guide rail.

5. The packaging apparatus according to claim 4, wherein each wheel group of the first side portion and second side portion comprises a front pair of wheels and a rear pair of wheels configured to be between the first guide rail and the second guide rail.

6. The packaging apparatus according to claim 2, wherein each operative unit is removably connected to the respective second side portion of the respective conveying cart.

7. The packaging apparatus according to claim 2, wherein each conveying cart comprises a main portion configured to be interposed between and connected to the first side portion and the second side portion, and wherein at least the first side portion is removably connected to the main portion.

8. The packaging apparatus according to claim 1, wherein each one of the plurality of conveying carts is configured to move independently from the other ones along the endless conveying device.

9. The packaging apparatus according to claim 1, wherein the endless conveyor device comprises a plurality of coil assemblies and each one of the conveyor carts comprises a magnet assembly configured to interact with the plurality of coil assemblies for controlling advancement of each one of the conveyor carts along the endless conveyor device.

10. The packaging apparatus according to claim 9, wherein each conveyor cart comprises a cart base moveably mounted to the endless conveyor device and carrying the respective operative unit and removably connected to the respective magnet assembly.

11. The packaging apparatus according to claim 1, further comprising a cam assembly spaced apart from the endless carrier device and configured to cooperate with the plurality of operative units; wherein each one of the plurality of operative units further comprises a cam follower configured to cooperate with the cam assembly for selectively moving the respective operative unit in its operative configuration or rest configuration.

12. The packaging apparatus according to claim 1, wherein each one of the operative units comprises one of a cutting element or a counter-cutting element configured to transversally cut the tube between adjacent packages.

13. The packaging apparatus according to claim 1, further comprising:
- an additional endless conveyor device arranged in the conveyor zone and facing the endless conveyor device;
- a plurality of additional conveying carts configured to cooperate with and to advance along the additional endless conveyor device; and
- a plurality of additional operative units moved by the additional conveying carts along an additional path defined by the movement of the additional conveying carts, wherein the additional path has an additional operative portion parallel to the advancement axis and the operative portion of the first path;
- wherein each additional operative unit is carried by one respective conveying cart and extends laterally away from the additional conveying cart in a transverse direction with respect to the advancement axis;
- wherein each additional operative unit is configured to be selectively moved between (a) a respective operative configuration, reached along said additional operative portion of the additional path and in which the additional operative unit is configured to manipulate the tube in collaboration with one respective operative unit, and (b) a respective rest configuration, reached along an additional rest portion of the additional path distinct from the additional operative portion and in which the additional operative unit is detached from the tube;
- wherein each additional operative unit comprises:
  - an additional half-shell configured to at least partially define in cooperation with the half-shell of the respective operative unit the shape of the packages; and
  - the other one of a sealing element or a counter-sealing element configured to transversally seal the tube, between adjacent packages, with respect to the advancement direction in collaboration with the counter-sealing element or the sealing element of the respective operative unit.

14. The packaging apparatus according to claim 13, wherein each additional operative unit comprises the other one of a cutting element or a counter-cutting element configured to transversally cut the tube between adjacent packages in collaboration with the counter-cutting element or the cutting element of the respective operative unit.

* * * * *